US008228468B2

(12) United States Patent
Furukawa et al.

(10) Patent No.: US 8,228,468 B2
(45) Date of Patent: Jul. 24, 2012

(54) LIQUID CRYSTAL DISPLAY PANEL AND LIQUID CRYSTAL DISPLAY DEVICE

(75) Inventors: Tomoo Furukawa, Osaka (JP); Kazuyoshi Fujioka, Osaka (JP); Katsuya Ogawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 418 days.

(21) Appl. No.: 12/593,799

(22) PCT Filed: Mar. 3, 2008

(86) PCT No.: PCT/JP2008/053737

§ 371 (c)(1), (2), (4) Date: Sep. 29, 2009

(87) PCT Pub. No.: WO2008/152835

PCT Pub. Date: Dec. 18, 2008

(65) Prior Publication Data

US 2010/0026942 A1 Feb. 4, 2010

(30) Foreign Application Priority Data

Jun. 14, 2007 (JP) ................................ 2007-158019

(51) Int. Cl.
*G02F 1/1335* (2006.01)

(52) U.S. Cl. ...................................................... 349/114

(58) Field of Classification Search ....................... None
See application file for complete search history.

(56) References Cited

U.S. PATENT DOCUMENTS

2003/0210216 A1 11/2003 Kim et al.
2003/0231267 A1 12/2003 Murai et al.
2004/0165129 A1 8/2004 Okumura
2004/0212575 A1 10/2004 Lin et al.
2004/0252263 A1 12/2004 Yang et al.
2004/0263467 A1 12/2004 Kitagawa et al.
2005/0174517 A1 8/2005 Kim et al.
2005/0264731 A1 12/2005 Itou et al.
2006/0221277 A1 10/2006 Yang et al.
2007/0013628 A1 1/2007 Kim et al.

(Continued)

FOREIGN PATENT DOCUMENTS

EP 2 131 232 A1 12/2009

(Continued)

OTHER PUBLICATIONS

EP Search Report for corresponding European patent application No. 08721157.9, dated Nov. 30, 2010.

(Continued)

*Primary Examiner* — Lucy Chien

(74) *Attorney, Agent, or Firm* — Nixon & Vanderhye P.C.

(57) ABSTRACT

With the present invention, a fitting curve (f1) of the gamma curve (e1) arranged to be above a fitting curve of the gamma curve (e2), except in a region where the fitting curve (f1) shows a reflectivity of 0 and the fitting curve of the gamma curve (e2) shows a transmissivity of 0, and a gamma curve (e1) of reflective display and a gamma curve (e2) of transmissive display are obtained from measurement. Further, the fitting curve (f1) includes no gray scale inversion but at least one point of inflection (P1) where a sign of a differential coefficient is switched over. Thereby, it becomes possible to realize a liquid crystal display panel and a liquid crystal display device, for displaying images in a transmissive mode and a reflective mode, each of the liquid crystal display panel and the liquid crystal display device easily having an improvement in display quality of reflective display.

16 Claims, 6 Drawing Sheets

U.S. PATENT DOCUMENTS

| | | | |
|---|---|---|---|
| 2007/0046606 | A1 | 3/2007 | Kim et al. |
| 2007/0076148 | A1 | 4/2007 | Yang et al. |

FOREIGN PATENT DOCUMENTS

| | | | |
|---|---|---|---|
| EP | 2 151 708 | A1 | 2/2010 |
| JP | 2001-028697 | | 1/2001 |
| JP | 2003-157052 | | 5/2003 |
| JP | 2003-167228 | | 6/2003 |
| JP | 2005-115282 | A | 4/2005 |
| JP | 2006-322958 | | 11/2006 |
| JP | 2007-133084 | A | 5/2007 |
| WO | WO 2008/129734 | | 10/2008 |

OTHER PUBLICATIONS

Lu et al., "Transflective In-Plane Switching Liquid Crystal Display," Journal of Display Technology, vol. 3, No. 1, Mar. 2007, pp. 15-21.

Zhu et al., "Transflective Liquid Crystal Displays," IEEE/OSA Journal of Display Technology, vol. 1, No. 1, Sep. 2005, pp. 15-29.

International Search Report for PCT/JP2008/053737 mailed Jun. 3, 2008.

LIQUID CRYSTAL DISPLAY PANEL AND LIQUID CRYSTAL DISPLAY DEVICE

This application is the U.S. national phase of International Application No. PCT/JP2008/053737 filed 3 Mar. 2008 which designated the U.S. and claims priority to Japanese Patent Application No. 2007-158019 filed 14 Jun. 2007, the entire contents of each of which are hereby incorporated by reference.

TECHNICAL FIELD

The present invention relates to a liquid crystal display panel which displays images in a transmissive mode and a reflective mode.

BACKGROUND ART

There has been known a liquid crystal display device including a region for displaying images in a transmissive mode by using a backlight as a light source, and another region for displaying images in a reflective mode by using external light as a light source. Such a liquid crystal display device can concurrently use the backlight and the external light, and therefore can always keep excellent display quality in any places, regardless of whether the liquid crystal display device is used indoors or outdoors. In such a liquid crystal display device, display is largely influenced by a gamma characteristic. In order to set the gamma characteristics of a transmissive display and a reflective display appropriately, a lot of research has been made from various points of view.

Originally, the liquid crystal display device for displaying images in both the transmissive mode and the reflective mode has been arranged such that a liquid crystal layer does not differ in thickness in a transmissive display region and a reflective display region. However, with this arrangement, the gamma characteristics of the transmissive display and the reflective display are different from each other. In order to cause the gamma characteristics of the reflective display region and the transmissive display region to be identical with each other, the liquid crystal layer has been arranged such that a thickness of the liquid crystal layer in the reflective display region is approximately a half of that in the transmissive display region.

FIG. 5 is a cross-sectional view illustrating a liquid crystal element 101 disclosed in Patent Literature 1. The liquid crystal element 101 employs a vertical alignment mode, and displays images in the transmissive mode and the reflective mode. The liquid crystal element 101 has an arrangement in which a liquid crystal layer is provided between a substrate 103 and a color filter substrate 102.

The liquid crystal element 101 includes a transmissive section 117 and a reflective section 118. On a substrate 103 side, a storage capacitor wiring 112, a gate insulating film 113, a transmissive electrode 109, a protection insulating film 114, and a reflective electrode 111 are stacked in this order on the reflective section 118 of the substrate 108. Among these, the gate insulating film 113 and the transmissive electrode 109 extend to cover the transmissive section 117. The reflective electrode 111 is arranged such that a reflective electrode film 116 is stacked on a resin interlayer insulating film 115. A top surface of the reflective electrode 111 has many convexities 111*a* and concavities 111*b*, and a flat portion 123.

Further, the color filter substrate 102 is arranged such that a transmissive substrate 105, a colored layer 106, and a transmissive electrode layer 107 are stacked in this order. Furthermore, in the transmissive section 117, a rivet 110*a* is provided so as to stick out from the transmissive electrode layer 107 toward a liquid crystal layer, and, in the reflective section 118, a rivet 110*b* is provided so as to stick out from the transmissive electrode layer 107 toward the liquid crystal layer.

In this arrangement, a cell thickness T of the transmissive section 117, a cell thickness R of the reflective section 118, a height Ri of a rivet, a diameter of a rivet, a thickness h of a resin film of the reflective electrode 111, a concavity-convexity depth Δ, a concavity-convexity pitch p, a clearance c, and the like are determined as appropriate. Particularly, in order to cause optical characteristics of the transmissive section 117 and the reflective section 118 to be identical with each other, the cell thicknesses T and R are set to be "R/T=1/2".

FIG. 6 shows gamma characteristics of the transmissive display and the reflective display in such an arrangement. Specifically, FIG. 6 shows an example where both the gamma characteristics of the transmissive display and the reflective display are set to be at "γ=2.2".

Citation List

Patent Literature 1

Japanese Patent Application Publication, Tokukai, No. 2006-322958 A (Publication Date: Nov. 30, 2006)

Patent Literature 2

Japanese Patent Application Publication, Tokukai, No. 2006-285255 A (Publication Date: Oct. 19, 2006)

Patent Literature 3

Japanese Patent Application Publication, Tokukai, No. 2004-333879 A (Publication Date: Nov. 25, 2004)

Patent Literature 4

Japanese Patent Application Publication, Tokukai, No. 2004-4828 A (Publication Date: Jan. 8, 2004)

Patent Literature 5

Japanese Patent Application Publication, Tokukai, No. 2003-157052 A (Publication Date: May 30, 2003)

SUMMARY OF INVENTION

However, there is a problem with a conventional liquid crystal display device for displaying images in the transmissive mode and the reflective mode, which liquid crystal display device has the same gamma characteristics of the transmissive display and the reflective display. That is, the reflective display is darker than the transmissive display, and therefore the reflective display is lower in display quality than the transmissive display. Patent Literature 2, for example, discloses a technique of causing the gamma characteristics of the transmissive display and the reflective display to be identical with each other. However, this technique also has the problem described above.

Further, Patent Literatures 3 through 5 disclose techniques each of which causes the transmissive display and the reflective display to have, independently, optimal gamma characteristics. However, these techniques require a complex arrangement of a liquid crystal drive circuit. Moreover, in some cases, such techniques cause, for example, a problem that the display quality decreases when only a part of a screen is irradiated by external light.

The present invention is made in view of the problems. An object of the present invention is to realize a liquid crystal display panel and a liquid crystal display device, for displaying images in a transmissive mode and a reflective mode, each of the liquid crystal display panel and the liquid crystal display device easily having an improvement in display quality of reflective display.

In order to attain the object, in a liquid crystal display panel of the present invention, for displaying images in a transmissive mode and a reflective mode, A liquid crystal display panel for displaying images in a transmissive mode and a reflective mode, (1) a first fitting curve is a fitting curve of a gamma curve of a reflective display, the gamma curve being obtained from measurement, a second fitting curve is a fitting curve of a gamma curve of a transmissive display, the gamma curve being obtained from measurement, (iii) the first fitting curve is above a second fitting curve, except in a region where the first fitting curve shows a reflectivity of 0, and also the second fitting curve shows a transmissivity of 0, and (iv) the first fitting curve includes no gray scale inversion but at least one point of inflection.

With the invention, (i) the fitting curve of the gamma curve (obtained from measurement) of the reflective display is above the fitting curve of the gamma curve (obtained from measurement) of the transmissive display, except in the region where the first fitting curve shows a reflectivity of 0, and also the second fitting curve shows a transmissivity of 0, and (ii) the fitting curve of the reflective display includes no gray scale inversion but at least one point of inflection. Thereby, it is possible to cause the reflective display to be brighter in a low-luminance region. This allows the reflective display to be clearer. Therefore, the contrast of the reflective display can be more clearly felt.

Further, such an improvement in display quality of the reflective display is carried out such that only luminance of a low gray scale display, which is a darker display, is improved as compared with a conventional display. Therefore, even in a case where the display is irradiated by external light, no big difference is generated in display quality between the transmissive display and the reflective display. Even in a case where a surface of the display is partially irradiated by the external light, it is possible for the surface of the display, as an entire surface, to retain high display quality. This is because the reflective display and the transmissive display are similar in display quality to each other. Therefore, it is possible to realize high display quality in both the transmissive display and the reflective display.

Furthermore, since such gamma characteristics of the reflective display and the transmissive display can be realized by adjusting cell thicknesses and areas of a cell region, it is unnecessary to have a complex arrangement in order that a liquid crystal drive circuit carries out processing with respect to display data, for each of the reflective display and the transmissive display. It is also unnecessary to have a complex arrangement for preparing different supply reference voltages for each of the reflective display and the transmissive display.

As described above, with the present invention, it is possible to realize a liquid crystal display panel for displaying images in a transmissive mode and a reflective mode, which liquid crystal display panel can easily have an improvement in display quality of the reflective display.

In order to attain the object, in the liquid crystal display panel of the present invention, the first fitting curve has a gamma value of 2.2 in a neighborhood of the point of inflection on a low-luminance gray scale side of the point of inflection, and has a gamma value in a range from 0.5 to 0.8 in a neighborhood of the point of inflection on a high-luminance gray scale side of the point of inflection.

With the invention, by setting the gamma value in the neighborhood of the point of inflection as described above, an amount of a change in the gamma value becomes sufficiently large between adjacent sides of the point of inflection. On a side where the gray scale is lower than the gray scale at the point of inflection, (i) it is possible to display brighter images than in a conventional display while the display characteristic is retained at "$\gamma=2.2$", and (ii) no difference is generated between the reflective display and the transmissive display. Further, on a side where the gray scale is higher than the gray scale at the point of inflection, no gray scale inversion occurs, and therefore there is no risk that images are displayed in an inappropriate manner in the reflective mode. Accordingly, it is possible to display images clearly, in particular, in the reflective mode.

In order to attain the object, in the liquid crystal display panel of the present invention, at least one region having a cell thickness dR is in a reflective region of a picture element, dR satisfying a relationship represented by an inequality $(9/16)\times dT\leqq dR\leqq 2\times dT$, where dT indicates a uniform cell thickness in a transmissive region of the picture element.

With the invention, it becomes easy to allow the fitting curve of the gamma curve of the reflective display to include no gray scale inversion but at least one point of inflection.

In order to attain the object, in the liquid crystal display panel of the present invention, in the reflective region on an active matrix substrate of the liquid crystal display panel, said at least one region includes a region where a first insulating film has a contact hole so that an picture element electrode of the reflective region is connected to a first electrode which is opposed to the picture element electrode, via the first insulating film.

With the invention, in the reflective region, there is the region where the contact hole is provided so as to connect the picture element electrode to the first electrode. Therefore, it becomes possible to carry out conventionally-impossible combination of gamma curves of regions of the reflective display by using the cell thickness to which the depth of the contact hole has been added. Accordingly, it becomes possible allow the fitting curve of the gamma curve of the reflective display to include no gray scale inversion but at least one point of inflection.

In order to attain the object, in the liquid crystal display panel of the present invention, the first electrode is opposed to a storage capacitor line via a second insulating film.

With the invention, it becomes possible to form the storage capacitor of the picture element between the first electrode and the storage capacitor line.

In order to attain the object, in the liquid crystal display panel of the present invention, on the active matrix substrate, on the active matrix substrate, the first electrode is provided in a route of supplying a data signal to both the picture element electrode of the reflective region and a picture element electrode of the transmissive region.

With the invention, it becomes possible to supply a data signal to the picture element electrodes of the reflective display and the transmissive display, via the first electrode.

In order to attain the object, in the liquid crystal display panel of the present invention, a projecting member projecting toward a liquid crystal layer is provided in a region of a counter substrate of the liquid crystal panel, the region facing the picture element electrode of the reflective region of the active matrix substrate.

With the invention, the projecting member is used as a member for setting a cell thickness of the reflective region. Therefore, it becomes possible to set a gamma characteristic by using the cell region of the reflective display to which the projecting member is formed.

In order to attain the object, in the liquid crystal display panel of the present invention, liquid crystal molecules of the liquid crystal layer is driven in a vertical alignment mode.

With the invention, the projecting member can be used not only as the member described above but also as a member for driving liquid crystal molecules in a vertical alignment mode.

In order to attain the object, in the liquid crystal display panel of the present invention, liquid crystal molecules of the liquid crystal layer is driven in a parallel alignment mode.

With the invention, it is possible to use the projecting member as a member for setting the cell thickness in a case where the liquid crystal molecules are driven in the parallel alignment mode.

In order to attain the object, in the liquid crystal display panel of the present invention, inequalities are satisfied:

$$2 \leqq (\text{area of third region})/(\text{area of first region}) \leqq 4;$$

and $$(\text{area of first region})/(\text{area of second region}) \geqq 2.5,$$

where the first region is a cell region where the picture element electrode of the reflective region of the active matrix substrate is opposed to a region of the counter substrate where no projecting member is provided, a second region is a cell region where the contact hole is opposed to the counter substrate, and a third region is a cell region where the picture element electrode of the reflective region of the active matrix substrate is opposed to the projecting member. With the invention, by setting the areas of the first, second, and third regions of the reflective region as described above, it becomes possible to allow the fitting curve of the gamma curve of the reflective display to include no gray scale inversion but at least one point of inflection.

In order to attain the object, in the liquid crystal display panel of the present invention, the reflective region has a uniform cell thickness.

With the invention, the reflective region has a uniform thickness. Therefore, it is possible to cause a cell of the reflective region to be flat.

In order to attain the object, in the liquid crystal display panel of the present invention, the reflective region has a plurality of cell thicknesses which are different from each other.

With the invention, it becomes possible to easily set the gamma characteristic of the reflective display by using a plurality of regions whose cell thicknesses are different from each other.

In order to attain the object, in the liquid crystal display panel of the present invention, inequalities are satisfied:

$$2 \leqq (\text{area of third region})/(\text{area of first region}) \leqq 4;$$

and $$(\text{area of first region})/(\text{area of second region}) \geqq 2.5,$$

where (i) the reflective region includes a first region having a cell thickness d1, a second region having a cell thickness d2, and a third region having a cell thickness d3, and (ii) d3<d1<d2 and d1=dt, and (iii) d2 is dR satisfying said relationship.

With the invention, by setting the cell thicknesses and cell areas of the first, second, and third regions of the reflective region as described above, it becomes possible to allow the fitting curve of the gamma curve of the reflective display to include no gray scale inversion but at least one point of inflection.

In order to attain the object, in the liquid crystal display panel of the present invention, in a case where the liquid crystal display panel employs 0-gray-scale to 63-gray-scale, a reflectivity corresponding to 31-gray-scale is not less than 40%.

With the invention, by setting the reflectivity corresponding to 31-gray-scale to be not less than 40%, it becomes easy to cause the gamma curve of the reflective display to include a point of inflection.

In order to attain the object, in the liquid crystal display panel of the present invention, in the case where the liquid crystal display panel employs 0-gray-scale to 63-gray-scale, the reflectivity corresponding to 31-gray-scale is not more than 60%.

With the invention, by setting the reflectivity corresponding to 31-gray-scale to be not more than 60%, it becomes easy to set the gamma characteristic in accordance with the condition of the cell thickness.

In order to attain the object, in the liquid crystal display panel of the present invention, in the case where the liquid crystal display panel employs 0-gray-scale to 63-gray-scale, an input gray scale falls in a range from 24-gray-scale to 40-gray-scale at the point of inflection.

With the invention, it becomes possible to obtain a standard for determining where the point of inflection should be positioned in order to cause the reflectivity to be a target value of the setting.

In order to attain the object, a liquid crystal display device of the present invention includes any one of the liquid crystal display panels described above.

With the invention, it is possible to realize a liquid crystal display device for displaying images in the transmissive mode and the reflective mode, which liquid crystal display device can easily have an improvement in display quality of the reflective display.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a graph of an embodiment of the present invention, showing each of gamma curves of a reflective display and a transmissive display of a liquid crystal display panel for displaying images in a transmissive mode and a reflective mode.

FIG. 2 is a graph of a comparative example of FIG. 1, showing each of gamma curves of a reflective display and a transmissive display of another liquid crystal display panel.

FIG. 3 is a view illustrating an arrangement of a pixel included in the liquid crystal display panel of FIG. 1 ((a) of FIG. 3 is a plan view illustrating the arrangement of the pixel included in the liquid crystal display panel of FIG. 1, and (b) of FIG. 3 is a cross-sectional view taken along the line A-B of (a) of FIG. 3).

FIG. 4 is a block diagram of the embodiment of the present invention, illustrating an arrangement of the liquid crystal display panel.

FIG. 5 is a cross-sectional view of a conventional technique, illustrating an arrangement of a pixel included in a liquid crystal display device for displaying images in a transmissive mode and a reflective mode.

FIG. 6 is a graph of the conventional technique, showing each of gamma curves in a case where, in the liquid crystal display device for displaying images in the transmissive mode and the reflective mode, gamma characteristics of the transmissive display and the reflective display are identical with each other.

REFERENCE SIGNS LIST

1 DISPLAY PANEL (LIQUID CRYSTAL DISPLAY PANEL)
e1 GAMMA CURVE (GAMMA CURVE OF REFLECTIVE DISPLAY, OBTAINED FROM MEASUREMENT)
e2 GAMMA CURVE (GAMMA CURVE OF TRANSMISSIVE DISPLAY, OBTAINED FROM MEASUREMENT)
f1 FITTING CURVE (FIRST FITTING CURVE)
P1 POINT OF INFLECTION
R REFLECTIVE REGION
T TRANSMISSIVE REGION
d1 through d3, dT CELL THICKNESS

DESCRIPTION OF EMBODIMENTS

One embodiment of the present invention is described below with reference to FIGS. 1 through 4.

Figure 4:
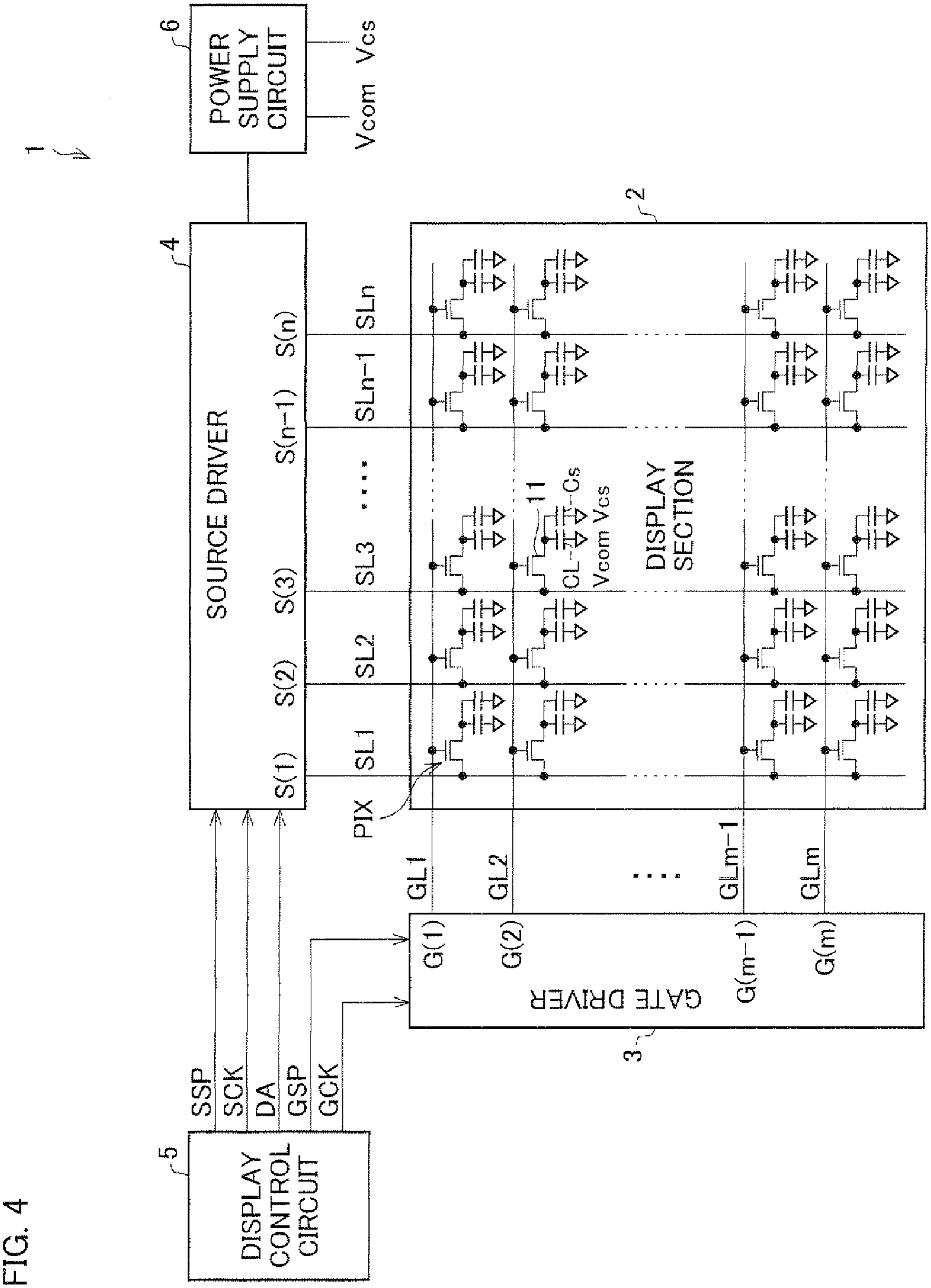
FIG. 4
Figure 5:
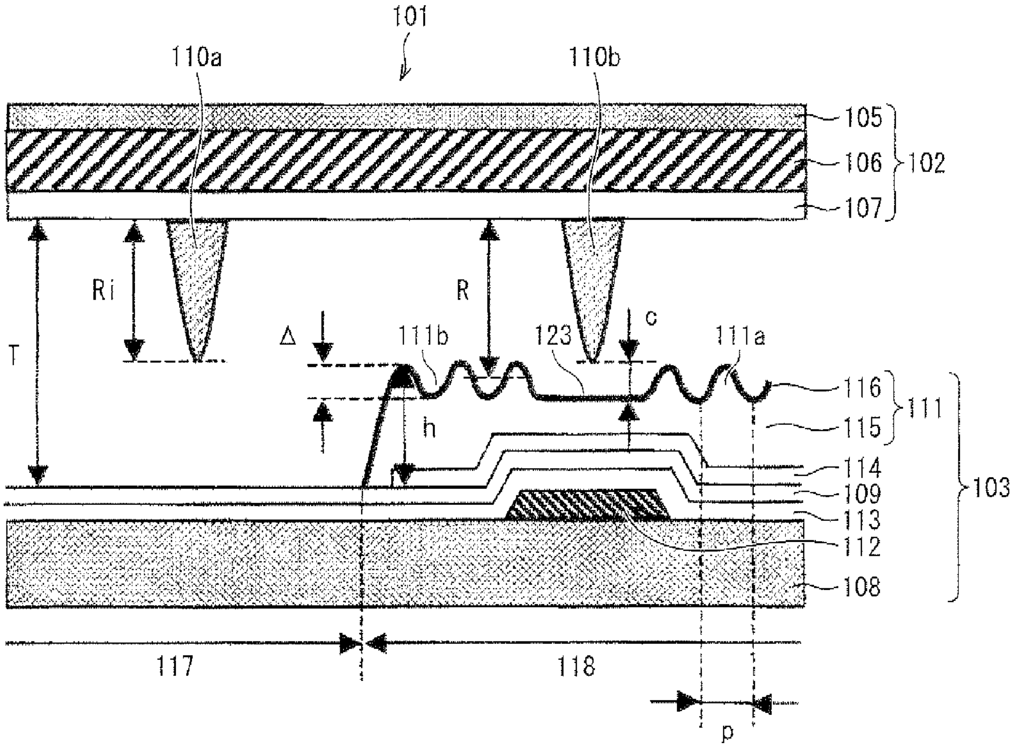
FIG. 5
Figure 6:
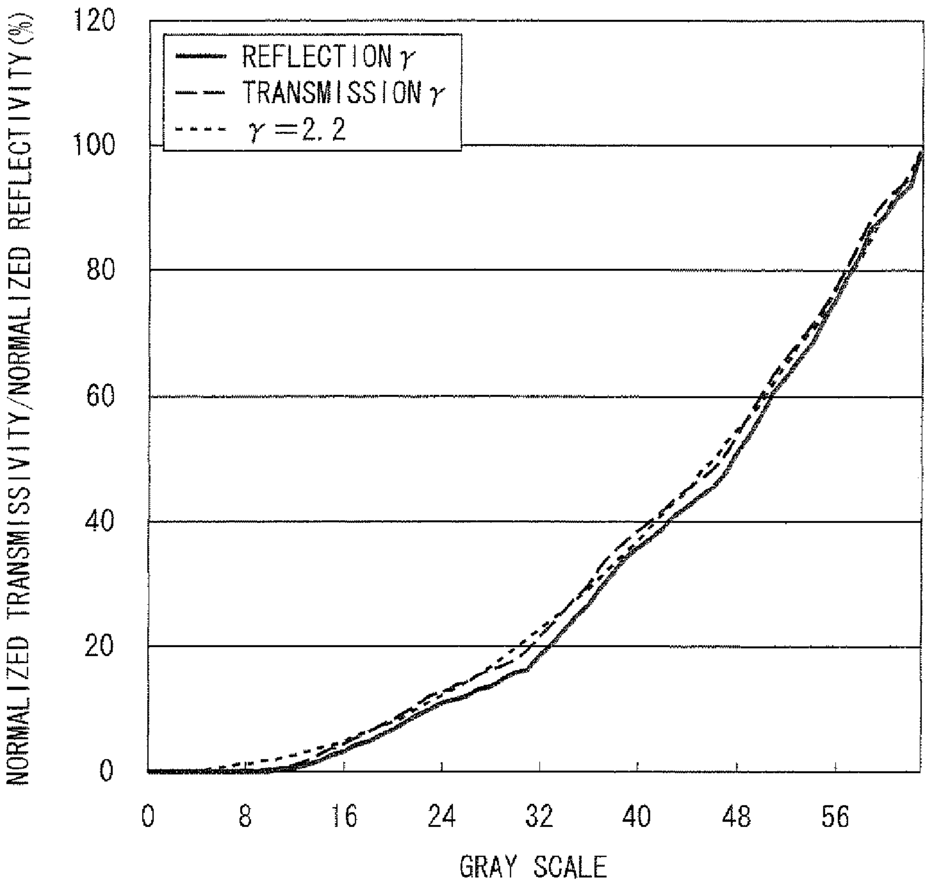
FIG. 6

FIG. 4 illustrates an arrangement of a display panel (liquid crystal display panel) 1 of the present embodiment. The display panel 1 is included in a liquid crystal display device which displays images in a transmissive mode and a reflective mode.

The display panel 1 is an active-matrix display device, and includes: a gate driver 3 serving as a scan signal line driving circuit; a source driver 4 serving as a data signal line driving circuit; a display section 2; a display control circuit 5 for controlling the gate driver 3 and the source driver 4; and a power supply circuit 6.

The display section 2 includes: gate lines GL1 through GLm, which serve as a plurality of (m) scan signal lines; source lines SL1 through SLn, which serve as a plurality of (n) data signal lines each of which intersects with the gate lines GL1 through GLm; and a plurality of (m×n) picture elements PIX, which are provided so as to correspond to respective intersections of the gate lines GL1 through GLm and the source lines SL1 through SLn. Not illustrated in FIG. 4 though, the display section 2 further includes storage capacitor lines CSL (see FIG. 3 explained below), which are parallel to the respective gate lines GL1 through GLm. Each of the storage capacitor lines CSL is assigned to a corresponding picture element line which is constituted by n picture elements aligned in a direction parallel to the gate lines GL1 through GLm.

The plurality of picture elements PIX are arranged in matrix so as to constitute a picture element array. Each of the plurality of picture elements PIX includes a TFT 11, a liquid crystal capacitor CL, and a storage capacitor Cs. A gate electrode 11*g* (see FIG. 3 explained below) of the TFT 11 is connected to a gate line GLj (1≦j≦m), a source electrode 11*s* (see FIG. 3) of the TFT 11 is connected to a source line SLi (1≦i≦n), and a drain electrode 11*d* (see FIG. 3) of the TFT 11 is connected to a picture element electrode 14 (see FIG. 3). The liquid crystal capacitor CL is constituted by the picture element electrode 14, a picture element electrode 21 (see FIG. 3) facing the picture element electrode 14, and the liquid crystal layer sandwiched between the picture element electrodes 14 and 21. The picture element electrode 21 receives a voltage Vcom from the power supply circuit 6. The liquid crystal capacitor CL and the storage capacitor Cs constitute a picture element capacitor. Note however that the picture element capacitor includes a parasitic capacitor formed between the picture element electrode 14 and respective peripheral wires.

Figure 3:
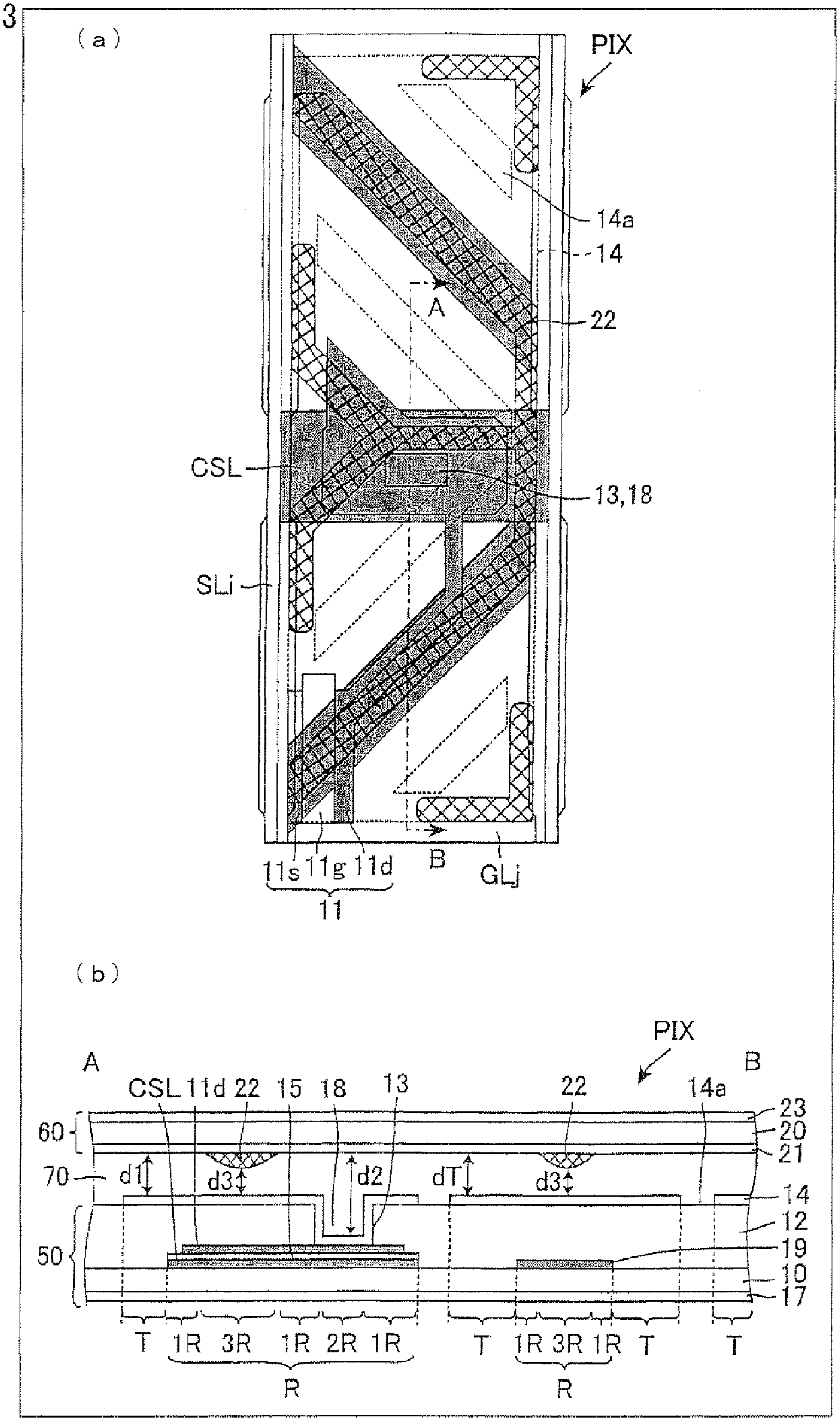
FIG. 3

Next, (a) of FIG. 3 is a plan view of the picture element PIX, and (b) of FIG. 3 is a cross-sectional view which is taken along the line A-B of (a) of FIG. 3.

As is clear from (b) of FIG. 3, each of the plurality of picture elements PIX includes: a back side substrate (active matrix substrate) 50; a viewing side substrate (counter substrate) 60 provided to be opposed to the back side substrate 50; and a liquid crystal layer 70 provided so as to be sandwiched between the back side substrate 50 and the viewing side substrate 60. Each of the plurality of picture elements PIX includes a transmissive region T and a reflective region R, and is a picture element of a liquid crystal display device which displays images in the transmissive mode and in the reflective mode and which can concurrently carry out both a transmissive display and a reflective display. In a case where the transmissive display is carried out, a backlight provided behind the back side substrate 50 is used as a light source, and in a case where the reflective display is carried out, external light or the like, which has entered into the liquid crystal layer 70 from a viewing screen side, is used as a light source.

As is clear from (a) and (b) of FIG. 3, the back side substrate 50 includes a glass substrate 10, on which the plurality of gate lines GL, which extend parallel to each other; the plurality of storage capacitor lines CSL, which extend parallel to each other; the plurality of source lines SL, which extend orthogonal to the plurality of gate lines GL and the plurality of storage capacitor lines CSL, and which extend parallel to each other; TFTs 11, which are provided at the respective intersections of the plurality of gate lines GL and the plurality of source lines SL; and an insulating film 12 provided on the TFTs 11. In each of the TFTs 11, (i) the gate electrode 11*g* is connected to the gate line GLj, (ii) the source electrode 11*s* is connected to the source line SLi, and (iii) the drain electrode 11*d* is electrically connected to the picture element electrode 14, via an opening 13 of the insulating film 12. Each of the picture element electrodes 14 extends to the transmissive region T and the reflective region R, and serves as (i) a picture element electrode of the transmissive region T and (ii) a picture element electrode of the reflective region R. The picture element electrode 14 is provided on the insulating film 12 except for a region of the opening 13.

The opening 13 of the insulating film 12 functions as a contact hole for connecting the picture element electrode 14 and the drain electrode 11*d* to each other, and also functions as a concavity 18 on a surface (facing the liquid crystal layer) of the back side substrate 50. The drain electrode (first electrode) 11*d* is opposed to the picture element electrode 14 via the insulating film 12, and is in a route of supplying the picture element electrode 14 with a data signal. The drain electrode 11*d* is provided with the storage capacitor line CSL so as to be opposed to the storage capacitor line CSL via an insulating film 15. The drain electrode 11*d* and the storage capacitor line CSL form the storage capacitor Cs. Further, in the back side substrate 50, a reflecting film 19 is provided so as to (i) block light from irradiating a projecting member 22 (which will be described later), and (ii) reflect external light coming from a back side, such as light from the backlight. Furthermore, on the back side of the glass substrate 10, a circular polarization plate 17 having such an arrangement that a polarizer and a quarter wave plate overlap each other is attached. In the circular polarization plate 17, an absorption axis of the polarizer is arranged to be at 45° to a slow axis of the quarter wave plate.

The viewing side substrate 60 includes a glass substrate 20, on which a color filter layer, such as a colored layer or a black matrix (BM), the picture element electrode 21, and an alignment film are stacked with each other in this order. On the picture element electrode 21, the projecting member 22 is formed so as to protrude toward the liquid crystal layer 70. The colored layer is such that a red layer (R), a green layer (G), a blue layer (B), and the like, are arranged to correspond to, respectively, the picture element electrodes 14 of the back side substrate 50. The projecting members 22 are provided so as to correspond to, respectively, the reflecting films 19 of the back side substrate 50. The picture element electrode 21 is formed as an entire surface electrode (common electrode). On the viewing side of the glass substrate 20, a circular polarization plate 23 constituted by a polarizer and a quarter wave plate is attached. In the circular polarization plate 23, an absorption axis of the polarizer is arranged to be at 45° to a slow axis of the quarter wave plate. Further, the slow axis of the quarter wave plate of the circular polarization plate 17 is arranged to be at 90° to the slow axis of the quarter wave plate of the circular polarization plate 23.

The liquid crystal layer 70 is made of nematic liquid crystal having a negative dielectric anisotropy. A display mode of the display panel 1 is a vertical alignment (VA) mode. When an applied voltage is off, liquid crystal is oriented perpendicular to surfaces of the alignment films of the substrates 50 and 60, and when the applied voltage is on, the liquid crystal is oriented in a horizontal direction with respect to the surfaces of the alignment films. In the present embodiment, in order to realize multi-domain vertical alignment, a narrow opening (slit) 14*a* is formed to the picture element electrode 14 of the back side substrate 50, and the projecting member 22 is formed to the viewing side substrate 60. This can (i) prevent disclination which is caused in such a manner that the liquid crystal is inclined disorderly, and (ii) realize uniform display in every viewing direction.

The transmissive region T has a certain constant cell thickness dT (thickness of the liquid crystal layer). On the other hand, the reflective region R includes a first region 1R having a cell thickness d1 which is identical with the cell thickness dT of the transmissive region T; a second region 2R having a cell thickness d2 which is greater than the cell thickness dT of the transmissive region T; and a third region 3R having a cell thickness d3 which is smaller than the cell thickness dT of the transmissive region T ($d3<d1<d2$, $d1=dT$).

The first region 1R is a cell region where the picture element electrode 14 of the reflective region R is opposed to a region of the viewing side substrate 60. To the region of the viewing side substrate 60, no projecting member 22 is provided. The second region 2R is a cell region where the opening 13 is opposed to the viewing side substrate 60. The cell thickness d2 includes a depth of the opening 13. The third region 3R is a cell region where the picture element electrode 14 of the reflective region R is opposed to the projecting member 22.

It should be noted that, each region where the opening 14*a* of the picture element electrode 14 is formed, that is, a region where no picture element electrode 14 is formed, is arranged to have the same cell thickness as a cell thickness which the region would have if the picture element electrode 14 was provided to the region. Such a region that the opening of the picture element electrode is formed, that is, a region where no picture element electrode 14 is formed, does not belong to any one of the first region 1R, the second region 2R, the third region 3R, and the transmissive region T.

With the picture element PIX having the arrangement described above, a gamma curve of the reflective display in the reflective region R is the one obtained by combining gamma curves of the first region 1R, the second region 2R, and the third region 3R with each other. In the present embodiment, the gamma curve of the transmissive display and the gamma curve of the reflective display are not caused to be identical with each other by any methods, and are left being different from each other. In this case, the gamma curve of the reflective display is arranged to be above the gamma curve of the transmissive display, and is also arranged to have at least one point of inflection. Further, the gamma curve of the reflective display is arranged to have no gray scale inversion which is unfavorable characteristically.

Here, the gamma curve means a fitting curve obtained in such a manner that a parameter of a theoretical curve is fitted to a gamma curve which is obtained from measurement. Further, the point of inflection means a point of inflection which appears in the fitting curve. The point of inflection is such a point that one of (i) a neighborhood which is close to the point of inflection from a low-luminance gray scale side as much as possible and (ii) a neighborhood which is close to the point of inflection from a high-luminance gray scale side as much as possible is such an upward-convex curve that a second differential coefficient is always negative, and the other neighborhood is such a downward-convex curve that a second differential coefficient is always positive. Here, the second differential coefficient may not exist at the point of inflection. In a case where the second differential coefficient exists at the point of inflection, the second differential coefficient is 0. The fitting curve described above is at least such a curve that gamma curves which have, respectively, a plurality of gamma values are successively connected to each other at the point of inflection. Further, there may be a point where the gamma curve of the reflective display shows a reflectivity of 0 and the gamma curve of the transmissive display shows a transmissivity of 0, and the gamma curves of the transmissive display and the reflective display overlap each other.

Figure 2:
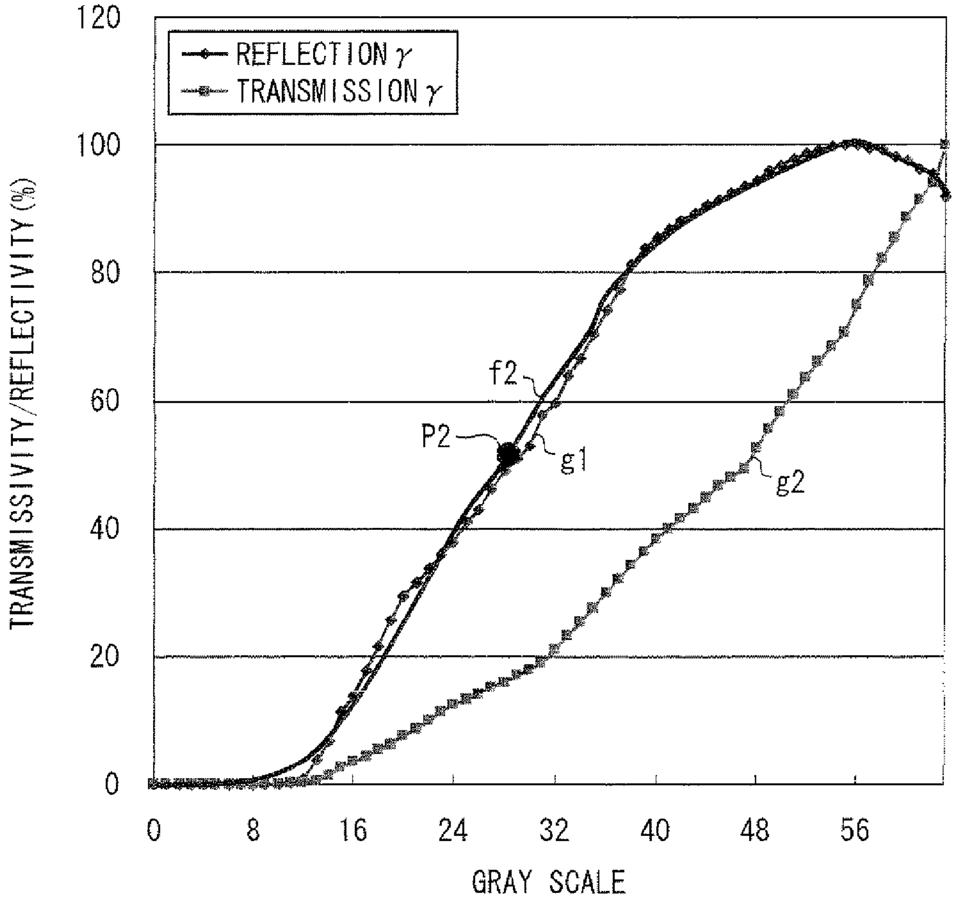
FIG. 2

The gray scale inversion means a phenomenon where as the gray scale of the reflective display becomes higher, the reflectivity becomes lower after reaching its maximum value, as illustrated in FIG. 2. Conventionally, in a case where the gamma curve of the reflective display is arranged to include the point of inflection, the gray scale inversion occurs. FIG. 2 is an example of a case where the fitting curve f2 includes an point of inflection P2 in the vicinity of a point at which the reflectivity is 50%, showing that the gray scale inversion occurs at a point before the fitting curve f2 reaches the maximum gray scale (before a normalized gray scale becomes 1). A curve g1 is the gamma curve of the reflective display. A curve g2 is the gamma curve of the transmissive display. The gamma curves of the reflective display and the transmissive display are obtained from measurement. The fitting curve of the gamma curve of the transmissive display is not shown in FIG. 2 for the sake of simple explanation.

With the picture element PIX of the present embodiment, a condition on which the gamma curve of the reflective display has at least one point of inflection can be represented by the following inequality.

$$(\text{area of third region } 3R)/(\text{area of first region } 1R) \leqq 4 \quad (1)$$

Further, a condition on which the gamma curve of the reflective display includes no gray scale inversion can be represented by the following inequalities.

$$(\text{area of third region } 3R)/(\text{area of first region } 1R) \geqq 2$$

and (area of first region $1R$)/(area of second region $2R$)≧2.5 (2)

Accordingly, a condition on which the gamma curve of the reflective display includes no gray scale inversion but at least one point of inflection can be represented by the following inequalities.

2≦(area of third region $3R$)/(area of first region $1R$)≦4 and (area of first region $1R$)/(area of second region $2R$)≧2.5 (3)

Each of the areas of the regions is determined in a case where each of the regions is viewed from above as illustrated in the plan view of (a) of FIG. 3. Further, technically, the cell thickness d3 of the third region 3R partially differs depending on a shape of the projecting member 22. However, here, the projecting member 22 has an approximately flat shape, and the cell thickness d3 is constant as being the shortest distance between the projecting members 22 and the picture element electrode 14.

It should be noted that in order to determine the conditions (1) through (3), a ratio of the cell thicknesses is set as the following equality.

d1:d2:d3=2:3.7:1 (4)

In order to set the conditions (1) through (3) described above, the reflective region R should have at least one region having a cell thickness dR. The cell thickness dT of the transmissive region T and the cell thickness dR of the reflective region R have a relationship represented by the following inequality.

$(9/16)\times dT \leqq dR \leqq 2\times dT$ (5)

In a case of (b) of FIG. 3, where the ratio of the cell thicknesses is set as Equality (4), the cell thickness d2 corresponds to the cell thickness dR which satisfies the relationship represented by Inequality (5). The reflective region R may be constituted by regions which have a uniform cell thickness dR which satisfies the relationship represented Inequality (5). Alternatively, as illustrated in (b) of FIG. 3, the reflective region R may be constituted by regions having 2 or more cell thicknesses which are different from each other. In this case, the cell thicknesses should include at least one cell thickness dR which satisfies the relationship represented by Inequality (5).

Figure 1:
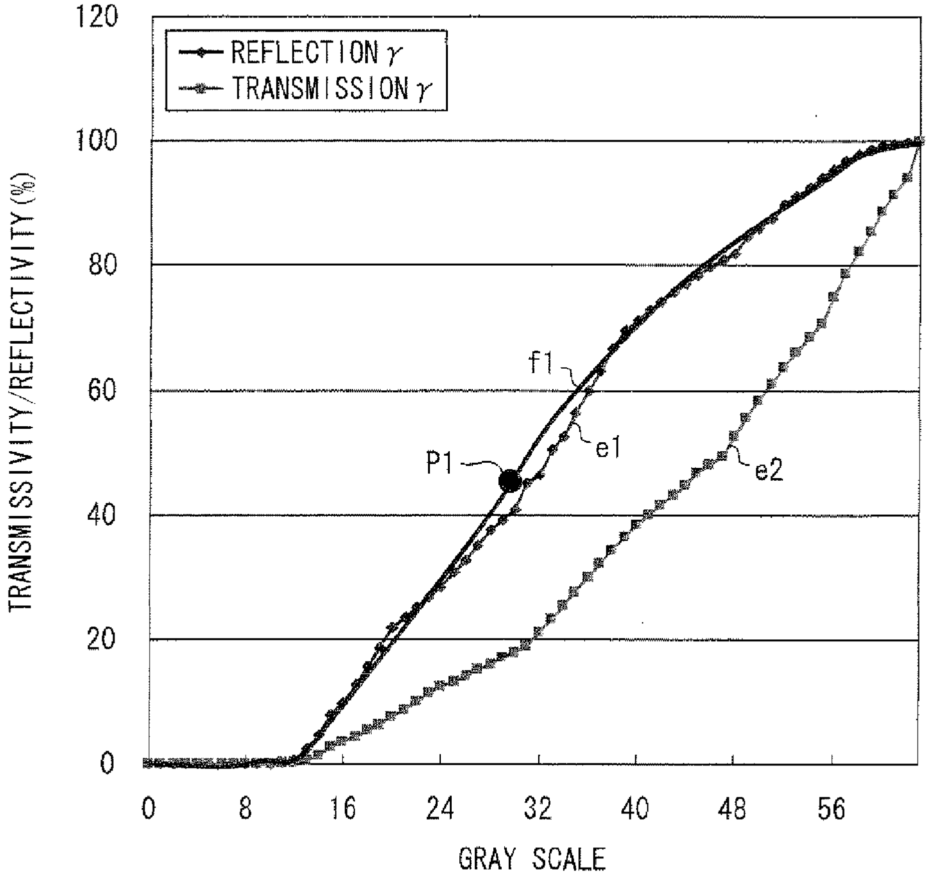
FIG. 1

FIG. 1 shows gamma characteristics in a case where (i) a fitting curve (first fitting curve) f1 of a gamma curve e1 which is obtained from measurement is above a fitting curve (second fitting curve, not shown in FIG. 1 for easier explanation) of a gamma curve e2 which is obtained from measurement, except in a region where the fitting curve f1 shows a reflectivity of 0 and the second fitting curve shows a transmissivity of 0, and (ii) the fitting curve f1 satisfies the condition represented by Inequalities (3). Since the fitting curve (second fitting curve) of the gamma curve e2 is almost identical with the gamma curve e2, and is clearly located below the fitting curve f1, the fitting curve of the gamma curve e2 is not shown in FIG. 1 for easier explanation.

In FIG. 1, the fitting curve f1 includes a point of inflection P1. At this point, it is preferable to set a gamma value of the reflective display so that a reflectivity corresponding to 31-gray-scale is in a range from 40% to 60%. This is because (i) if the reflectivity corresponding to 31-gray-scale, which is a gray scale in the vicinity of the middle between maximum and minimum gray scales, is set to be lower than 40%, the gamma curve of the reflective display includes no point of inflection, and (ii) it is difficult to set the reflectivity corresponding to 31-gray-scale to be higher than 60%, within the range of the cell thickness represented by Inequality (5) Therefore, by setting the reflectivity corresponding to 31-gray-scale to be higher than 40%, it becomes easy to allow the gamma curve of the reflective display to include a point of inflection, and by setting the reflectivity corresponding to 31-gray-scale to be lower than 60%, it becomes easy to set the gamma characteristic while satisfying the condition of the cell thickness. Further, if the point of inflection is provided between 24-gray-scale and 40-gray-scale, it becomes easy to cause the reflectivity to be a target value of the setting Because of this, the range between 24-gray-scale and 40-gray-scale can be a standard for determining where the point of inflection should be provided in order to cause the reflectivity to be the target value of the setting.

Further, it is possible to provide a plurality of points of inflection. The gamma value varies between adjacent sides of each of the points of inflection, but the gamma value may vary in any region in the curve. This can be realized by combining, as described above, the plurality of gamma curves with each other.

Conventionally, the gamma values of both the reflective display and the transmissive display have been often set to be "$\gamma$=2.2". In such a case, the reflectivity corresponding to 31-gray-scale is low (21%).

Thus, in the present embodiment, (i) the fitting curve of the gamma curve (obtained from measurement) of the reflective display is above the fitting curve of the gamma curve (obtained from measurement) of the transmissive display, except in the region where the fitting curve of the reflective display shows a reflectivity of 0 and the fitting curve of the transmissive display shows a transmissivity of 0, and (ii) the fitting curve of the reflective display includes no gray scale inversion but at least one point of inflection. Therefore, it becomes possible to cause the reflective display to be brighter in a low-luminance region. As a result, it is possible to cause the reflective display to be clearer. Thereby, the contrast of the reflective display can be felt more clearly.

Further, such gamma characteristics of the reflective display and the transmissive display can be realized by adjusting the cell thicknesses and the areas of the cell region. Therefore, it is unnecessary to have a complex arrangement in order that a liquid crystal drive circuit carries out processing with respect to display data, for each of the reflective display and the transmissive display. It is also unnecessary to have a complex arrangement for preparing different supply reference voltages for each of the reflective display and the transmissive display.

Particularly, in the fitting curve f1 in FIG. 1, the gamma value is set to be "$\gamma$=2.2" in the neighborhood of and on the low-luminance gray scale side of the point of inflection P1, and the gamma value is set to be in a range of "$\gamma$=0.5-0.8" in the neighborhood of and on the high-luminance gray scale side of the point of inflection P1. The fitting curve f1 has a downward-convex shape at the point of "$\gamma$=2.2", and has an upward-concave shape at the point of "$\gamma$=0.5-0.8". By setting the gamma value in the neighborhood of the point of inflection as described above, an amount of change in the gamma value becomes sufficiently large between adjacent sides of the point of inflection. This means, on a side where the gray scale is lower than the gray scale at the point of inflection, (i) it is possible to realize display which is brighter than conventional display while a display characteristic is retained at "$\gamma$=2.2", and also (ii) no difference is generated between the reflective display and the transmissive display. Further, on a side where the gray scale is higher than the gray scale at the point of inflection, the gray scale inversion does not occur, and therefore there is no risk that images are displayed in an inappropriate manner in the reflective mode. Accordingly, it is possible to display images clearly, in particular, in the reflective mode.

Further, such an improvement in display quality of the reflective display is carried out such that only luminance of a low-gray scale display, which is a darker display, is improved, as compared with conventional display. Therefore, even in a case where a display is irradiated by the external light, no big difference is generated in display quality between the transmissive display and the reflective display. Even in a case where a surface of the display is partially irradiated by the external light, it is possible for the surface of the display, as an entire surface, to keep high display quality. This is because the reflective display and the transmissive display are similar in display quality to each other. Therefore, it is possible to realize excellent display quality in both the transmissive display and the reflective display.

In the present embodiment, the gamma characteristics of FIG. 1 are realized with the use of the arrangement illustrated in (b) of FIG. 3. At that time, the second region 2R is formed with the opening 13 for connecting the picture element electrode 14 and the drain electrode 11*d*, both of which are provided in the reflective region R, to each other. Therefore, by using the cell thickness to which the depth of the opening 13 has been added, it becomes possible to carry out a conventionally-impossible combination of the gamma curves of the reflective display on the condition represented by Inequalities (3). As a result, it is possible to realize the gamma characteristic shown in FIG. 1.

It should be noted that in the example described above, the vertical alignment (VA) liquid crystal is used. However, the present invention is not limited to this, and liquid crystal employing an arbitral drive mode can be used. It is possible to (i) fill the cell illustrated in (a) and (b) of FIG. 3 with parallel alignment liquid crystal, and (ii) use the projecting members 22 only to control the cell thickness.

By attaching, to the liquid crystal panel thus described, various devices such as peripheral circuits and a backlight (the backlight can be included in the liquid crystal display panel), a bezel, and the like, a liquid crystal display device can be manufactured.

The present invention is not limited to the description of the embodiments above, but may be altered by a skilled person within the scope of the claims. An embodiment based on a proper combination of technical means disclosed in different embodiments is encompassed in the technical scope of the present invention.

As described above, in a liquid crystal display panel of the present invention, for displaying images in a transmissive mode and a reflective mode, (i) a first fitting curve is a fitting curve of a gamma curve of a reflective display, the gamma curve being obtained from measurement, (ii) a second fitting curve is a fitting curve of a gamma curve of a transmissive display, the gamma curve being obtained from measurement, (iii) the first fitting curve is above a second fitting curve, except in a region where the first fitting curve shows a reflectivity of 0, and also the second fitting curve shows a transmissivity of 0, and (iv) the first fitting curve includes no gray scale inversion but at least one point of inflection.

With the arrangement, it becomes possible to realize a liquid crystal display panel for displaying images in a transmissive mode and a reflective mode, which liquid crystal display panel can easily have an improvement in display quality of reflective display.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is suitable for use in a liquid crystal display device for displaying images in a transmissive mode and a reflective mode.

The invention claimed is:

1. A liquid crystal display panel for displaying images in a transmissive mode and a reflective mode, a first fitting curve being a fitting curve of a gamma curve of a reflective display, the gamma curve being obtained from measurement, a second fitting curve being a fitting curve of a gamma curve of a transmissive display, the gamma curve being obtained from measurement, the first fitting curve being above a second fitting curve, except in a region where the first fitting curve shows a reflectivity of 0, and also the second fitting curve shows a transmissivity of 0, and the first fitting curve including no gray scale inversion but at least one point of inflection, the first fitting curve has a gamma value of 2.2 in a neighborhood of the point of inflection on a low-luminance gray scale side of the point of inflection, and has a gamma value in a range from 0.5 to 0.8 in a neighborhood of the point of inflection on a high-luminance gray scale side of the point of inflection.

2. The liquid crystal display panel according to claim 1 wherein:

at least one region having a cell thickness dR is in a reflective region of a picture element, dR satisfying a relationship represented by an inequality $(9/16)\times dT \leqq dR \leqq 2\times dT$, where dT indicates a uniform cell thickness in a transmissive region of the picture element.

3. The liquid crystal display panel according to claim 2, wherein:

in the reflective region on an active matrix substrate of the liquid crystal display panel, said at least one region includes a region where a first insulating film has a contact hole so that an picture element electrode of the reflective region is connected to a first electrode which is opposed to the picture element electrode, via the first insulating film.

4. The liquid crystal display panel according to claim 3, wherein:

the first electrode is opposed to a storage capacitor line via a second insulating film.

5. The liquid crystal display panel according to claim 3, wherein:

on the active matrix substrate, the first electrode is provided in a route of supplying a data signal to both the picture element electrode of the reflective region and a picture element electrode of the transmissive region.

6. The liquid crystal display panel according to claim 3, wherein:

a projecting member projecting toward a liquid crystal layer is provided in a region of a counter substrate of the liquid crystal panel, the region facing the picture element electrode of the reflective region of the active matrix substrate.

7. The liquid crystal display panel according to claim 6, wherein:

liquid crystal molecules of the liquid crystal layer are driven in a vertical alignment mode.

8. The liquid crystal display panel according to claim 6, wherein:

liquid crystal molecules of the liquid crystal layer are driven in a parallel alignment mode.

9. The liquid crystal display panel according to claim 6, wherein:

inequalities are satisfied:

$$2 \leqq (\text{area of third region})/(\text{area of first region}) \leqq 4;$$

and $$(\text{area of first region})/(\text{area of second region}) \geqq 2.5,$$

where the first region is a cell region where the picture element electrode of the reflective region of the active matrix substrate is opposed to a region of the counter substrate where no projecting member is provided, a second region is a cell region where the contact hole is opposed to the counter substrate, and a third region is a cell region where the picture element electrode of the reflective region of the active matrix substrate is opposed to the projecting member.

10. The liquid crystal display panel according to claim 2, wherein:

the reflective region has a uniform cell thickness.

11. The liquid crystal display panel according to claim 2, wherein:

the reflective region has a plurality of cell thicknesses which are different from each other.

12. The liquid crystal display panel according to claim 2, wherein:

inequalities are satisfied:

$$2 \leqq (\text{area of third region})/(\text{area of first region}) \leqq 4;$$

and $$(\text{area of first region})/(\text{area of second region}) \geqq 2.5,$$

where (i) the reflective region includes a first region having a cell thickness d1, a second region having a cell thickness d2, and a third region having a cell thickness d3, and (ii) d3<d1<d2 and d1=dT, and (iii) d2 is dR satisfying said relationship.

13. The liquid crystal display panel according to claim 1, wherein:

in a case where the liquid crystal display panel employs 0-gray-scale to 63-gray-scale, a reflectivity corresponding to 31-gray-scale is not less than 40%.

14. The liquid crystal display panel according to claim 1, wherein:

in the case where the liquid crystal display panel employs 0-gray-scale to 63-gray-scale, the reflectivity corresponding to 31-gray-scale is not more than 60%.

15. The liquid crystal display panel according to claim 13, wherein:

in the case where the liquid crystal display panel employs 0-gray-scale to 63-gray-scale, an input gray scale falls in a range from 24-gray-scale to 40-gray-scale at the point of inflection.

16. A liquid crystal display device comprising a liquid crystal display panel recited in claim 1.

* * * * *